(12) United States Patent
Sala

(10) Patent No.: US 9,929,443 B2
(45) Date of Patent: Mar. 27, 2018

(54) SOLAR USB CHARGER

(76) Inventor: Anthony D Sala, San Josa, CA (US)

( * ) Notice: Subject to any disclaimer, the term of this patent is extended or adjusted under 35 U.S.C. 154(b) by 847 days.

(21) Appl. No.: 13/103,972

(22) Filed: May 9, 2011

(65) Prior Publication Data

US 2011/0273133 A1  Nov. 10, 2011

Related U.S. Application Data

(60) Provisional application No. 61/395,141, filed on May 8, 2010.

(51) Int. Cl.
*H02J 7/00* (2006.01)
*H01M 10/46* (2006.01)

(52) U.S. Cl.
CPC .................. *H01M 10/465* (2013.01)

(58) Field of Classification Search
CPC .................. H02J 7/35; H01M 10/465

USPC .......................................................... 320/101
See application file for complete search history.

(56) References Cited

U.S. PATENT DOCUMENTS

| 4,091,320 | A | * | 5/1978 | Foster ........................... 320/141 |
| 5,006,781 | A | * | 4/1991 | Schultz et al. .................. 322/25 |
| 5,521,578 | A | * | 5/1996 | DelValle ....................... 340/330 |
| 6,134,902 | A | * | 10/2000 | Curry ............................. 62/236 |
| 2004/0189445 | A1 | * | 9/2004 | Tewell et al. .............. 340/384.7 |
| 2007/0222410 | A1 | * | 9/2007 | Lee ..................... H01L 31/0236 320/101 |
| 2009/0007958 | A1 | * | 1/2009 | Ho et al. ....................... 136/245 |

* cited by examiner

*Primary Examiner* — Robert Grant
(74) *Attorney, Agent, or Firm* — J. Curtis Edmondson; Anitha Shankar Narayan; Law Offices of J. Curtis Edmondson

(57) ABSTRACT

A solar USB charger for providing power to electrical devices from solar energy without the use of an internal battery comprising of at least one solar cell, an electronic circuit and a means to connect the device to the item than needs to be charged.

7 Claims, 4 Drawing Sheets

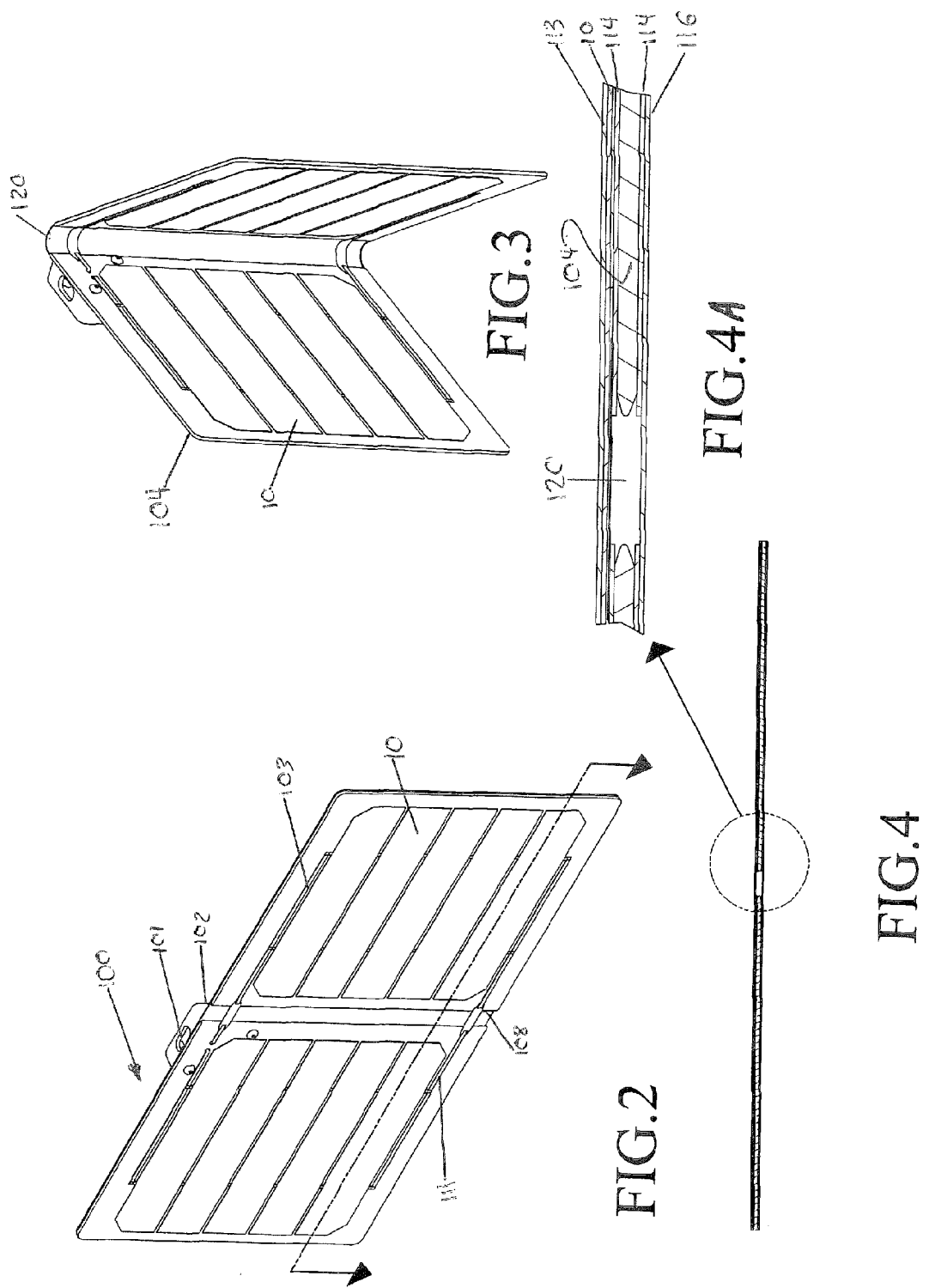

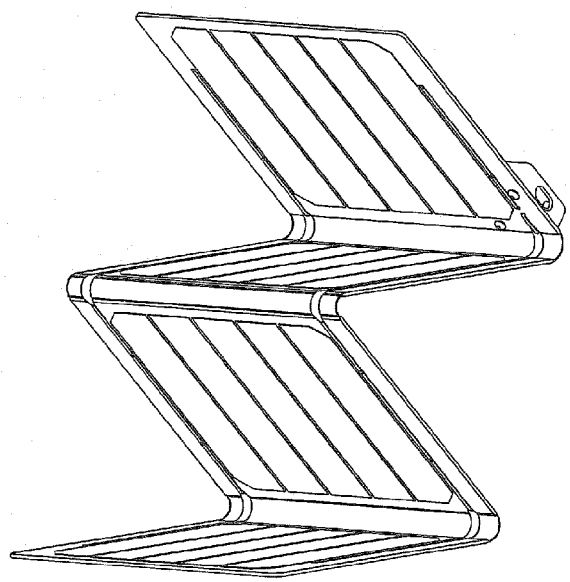
FIG. 6B
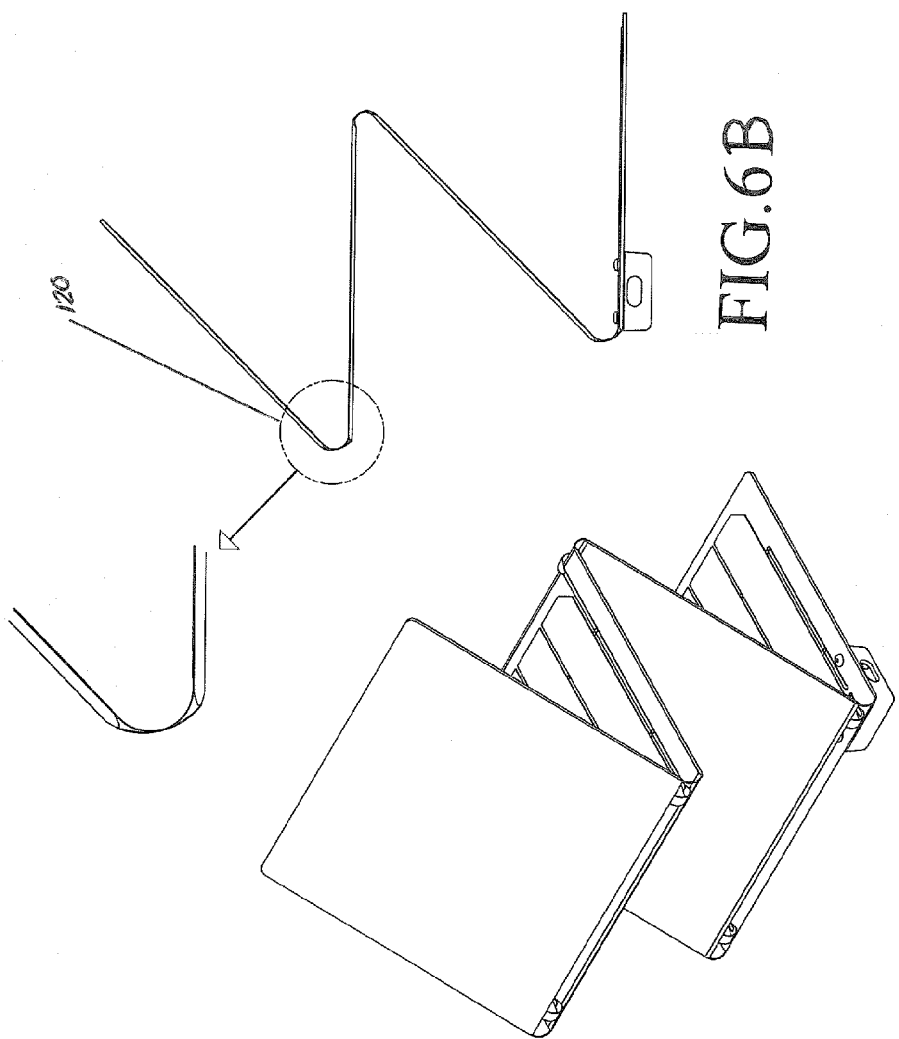
FIG. 6C
FIG. 6A

SOLAR USB CHARGER

PRIORITY

The invention claims the priority date of provisional patent application 61/395,141 filed on May 8, 2010.

BACKGROUND OF THE INVENTION

Field of Invention

The invention relates generally to the field of providing energy to electronic devices utilizing solar energy and more particularly to a portable lightweight section of solar panels suitable for use with small devices such as smart phones, personal music devices, PDA (personal data assistants) and cellular telephones.

Related Art

The majority of today's electronic devices are compatible with the USB (universal serial bus) specification for the transferring of data as well as for receiving power in the form of D.C. (direct current) voltage of approximately 5 volts. This specification has become obsequious with roughly 6 billion of these connectors sold to date.

Most portable devices utilize rechargeable batteries encased within the unit and are equipped with a remote charger, typically a transformer in conjunction with a rectifier, which converts household alternating current into a suitable d.c. current. This is a good solution unless the user is not located near a suitable energy source. The use of a remote power source is then required one option is to use the sun's solar energy via a photo-voltaic cell or series of cells.

There have been various attempts to utilize the sun to power cellular phones U.S. Pat. No. 6,977,479 to Hsu and U.S. Pat. No. D505,113 to Lam are examples but each has various drawbacks.

BRIEF SUMMARY

The current inventive material provides for, according to one general embodiment, a solar USB charger that provides at least 5 watts of power in a compact form that can both charge and simultaneously run a variety of popular electronic devices such as iPod®, iPhone®, HTC/Droid®, Blackberry®, Palm®, iPad® eReaders, game devices or virtually any other portable device that can be charged through a USB port.

The device is water resistant and can be used at outdoor events, such as camping, backpacking, and anytime where there is no power available. It also is very lightweight in comparison to its power output and provides for a rather quick charge in relation to traditional trickle chargers.

It is also very durable and simple because of the low profile folding design that protects the solar cells from impact or scratching when the device is not in use. Another factor that increases the durability of the charging device is that it does not incorporate an internal battery, that is, this device directly charges the battery in the portable device, rather than contain a battery in its circuit. This is an important feature because batteries can be degraded and fail when exposed to high temperatures, such as those experienced by placing the solar cell in direct sunlight. This affects the longevity and usefulness of the charger as well as creates a greener product.

Furthermore the charger can be used to charge a variety of rechargeable batteries such as AA/AAA batteries with the proper adapter.

Other aspects and advantages of the present invention will become apparent from the following detailed description which when taken in conjunction with the drawings, illustrates by way of example the principles and structure of the invention.

BRIEF DESCRIPTION OF THE DRAWINGS

Taking the following specifications in conjunction with the accompanying drawings will cause the invention to be better understood regarding these and other features and advantages. The specifications reference the annexed drawings wherein:

FIG. 2 is a frontal perspective view of a solar USB charger.

FIG. 3 is analogous to FIG. 2 with a solar USB Charger partially folded.

FIG. 4 is cross-sectional top view along section A-A of FIG. 2 of a USB charger.

FIG. 4A is magnified view of FIG. 4.

FIG. 6A is a side perspective view of an alternative embodiment of a solar USB Charger.

FIG. 6B is a top view of an alternative embodiment of a solar USB Charger.

FIG. 6C is a front perspective view of an alternative embodiment of a solar USB Charger.

DETAILED DESCRIPTION OF THE PREFERRED EMBODIMENTS

While describing the invention and its embodiments, various terms will be used for the sake of clarity. These terms are intended to not only include the recited embodiments, but also all equivalents that perform substantially the same function, in substantially the same manner to achieve the same result.

Figure 1:
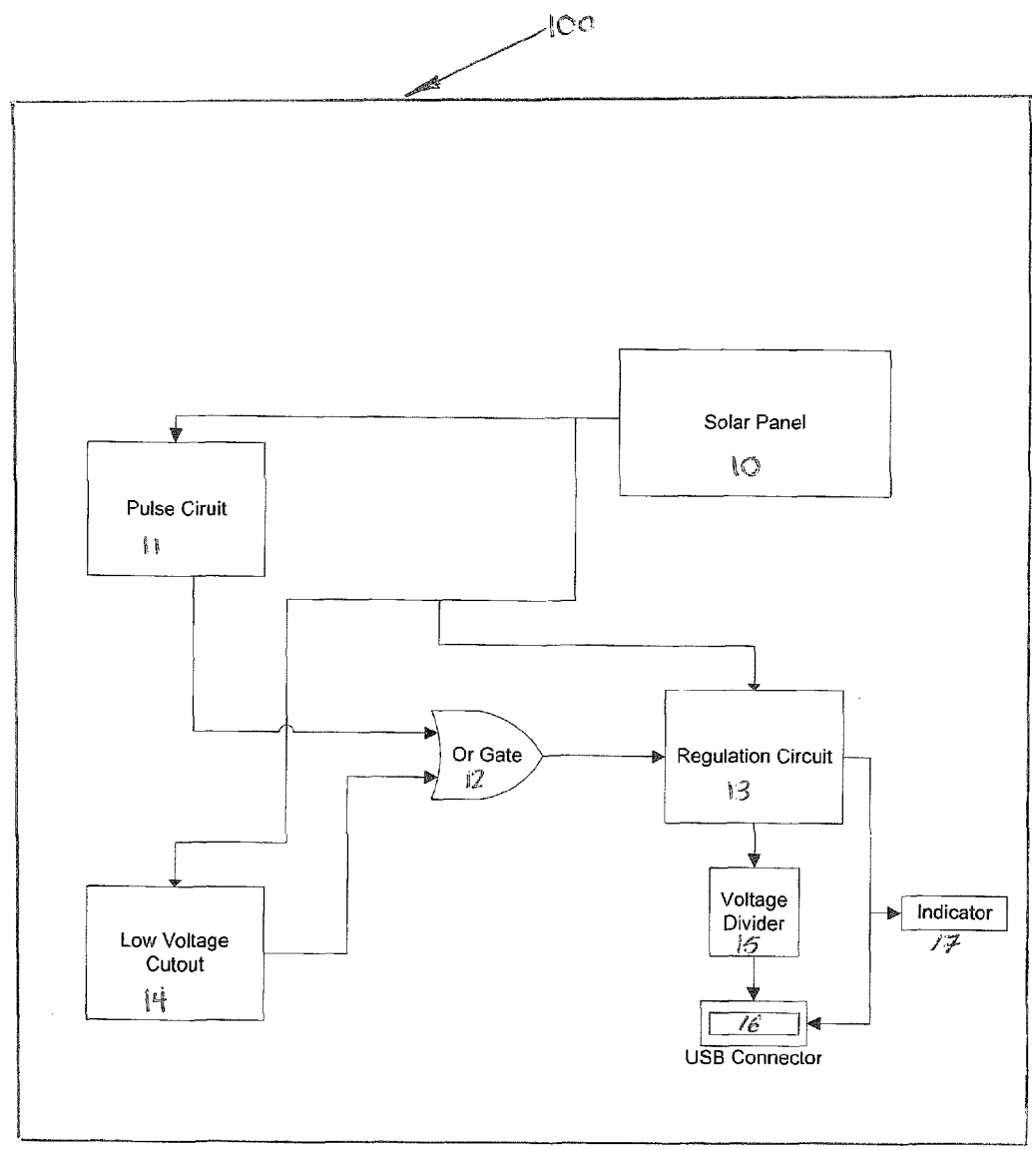
FIG. 1 is a generalized block diagram of a solar USB charger.

Referring to FIG. 1 a generalized block diagram of a solar USB charger generally reference by the numeral 100 and also referred to as a portable solar powered power supply for the use of charging portable electronic devices that includes at least one solar panel 10 which converts solar energy into electrical energy preferably in a range of up to 7 volts to deliver approximately 5 watts of power. The photovoltaic cell or cells 10 are electronically connected to a pulse circuit 11, a regulation circuit 13, and a low voltage cutout 14. The solar USB charger described in FIG. 1 charges the portable electronic devices directly without having an internal battery in its circuit. The amount of energy generated by a photovoltaic cell is directly proportional to the amount of sunlight received, so the more sun the panel 10 receives the higher the voltage and conversely the less sun received, such as in the instance of shade, cloud cover, overcast or darkness the lower the voltage generated. The low voltage cutout 14 is a switch that disconnects current flow to the device if the voltage falls below a certain threshold, to be USB compliant this voltage is 5 volts direct current, however in varying embodiments this amount could vary, but the purpose is to prevent battery drainage from the device.

The pulse circuit 11 provides a voltage pulse to the device from the charger at a predetermined frequency, in one embodiment a frequency of every two minutes is desired. This essentially resets the charging circuitry within the device to correct for passing clouds or other factors that reduce the charger's output. Some devices have different charging modes or amperages, pulsing ensures that the optimal and thus fastest setting is used at all times. Another benefit of this pulsing is to trigger the device's chirping signal which occurs when most devices are attached to a charger, this audible alert reminds you that your device is charging and also serves to help locate it without increased hardware in the charging circuit.

The regulation circuit 13 ensures that a consistent voltage is received by the device; in one embodiment the USB voltage of 5 vdc is contemplated. The indicator 17 is a visible indicator or light allowing the user to verify that the charger is working. Controlling voltage fluctuations is important to protect the circuitry of the portable device from being overloaded. The OR gate 12 determines whether or not to continue charging the device. The voltage divider 15 is required by some devices to allow charging, it simply applies varying voltage to select pins of the device, so that it will receive and regulate a charge. In one embodiment a USB connector 16, type "A" style is the interface between the charger and the device, but other similar plug and socket configurations are also contemplated.

Now referring to FIG. 2 and FIG. 3 which discloses a preferred embodiment of the present invention, a solar USB charger 100 with the charger fully open and partially opened respectively wherein there are at least two solar cells 10 are mounted to at least two rigid backing boards 104. The backing boards 104 are relatively narrow and substantially rectangular and are configured so that one side of each board is parallel to that of the opposing board and configured so that there is a small gap between the two forming a hinge point 120, similar to the configuration of a typical bi-fold wallet, so that the two halves are pivotally connected. The panels and photovoltaic cells are laminated together to form a continuous structure wherein the solar panels 10 are electronically connected to each other by an electrical flex circuit 108 that completes the circuit from the solar cells through negative and positive buses 111,103 to the charging circuitry which is in an enclosure 102 mounted on the external face of the backing board 104, that is the face opposite of the photovoltaic cells. The enclosure also contains a means of electrically connecting the charging circuit to the electronic device 101 in one embodiment this is a USB connector.

The photovoltaic or solar cells 10 are electronically connected together by a low profile ribbon connector that traverses the interstitial gap. The gap acts as a hinge point for the charger, in one embodiment the gap is approximately one half of an inch wide with a thickness of around 12 mil (0.012"), with each panel being approximately six inches by five and a half inches with a thickness of approximately 1/8 of an inch or less.

Because the charger 100 is constructed of rigid materials it can be laid flat on a surface or can be stood on edge as in FIG. 3 if so desired.

Now referring to FIG. 4 and FIG. 4A depict cross-sectional details of a USB solar charger 100 at the hinge point 120, prior to finally assembly, comprising of at least two hard backer substrates 104. In one embodiment the use of a material consistent with the FR-4 specification is preferred. This material is a rigid material and is relatively thin of compressed epoxy fiberglass or equivalent with two opposing faces that are parallel to each other at the hinge point with the leading end of these parallel surfaces of the backing board tapered to form a knife-like edge or a beveled edge, this structure allows for a smooth and even transition of the front sheet 113 and the back sheet 116 over the backing boards to minimize the thickness of the hinge point.

The backing board has a front (internal) and a back (external) side and affixed to the front side is a photovoltaic cell 10 and respective bus bars with the entire structure sandwiched between two sections of ultra violet resistant clear sheets 113 adhered to the board and the solar cell with the proper adhesive. In one embodiment the sheet has a thickness of approximately 6 mil and contemplates the use of ETFE (ethylene tetrafluoroethylene) with an adhesive polymer such as EVA (Ethyl Vinyl Acetate or equivalent), but other varieties of plastic have also been contemplated. The combination of the thin coversheet, the tapered backing and the gap produces a hinge that is very thin and durable allowing the charger to be folded upon itself and to retain a very thin profile.

Figure 5:
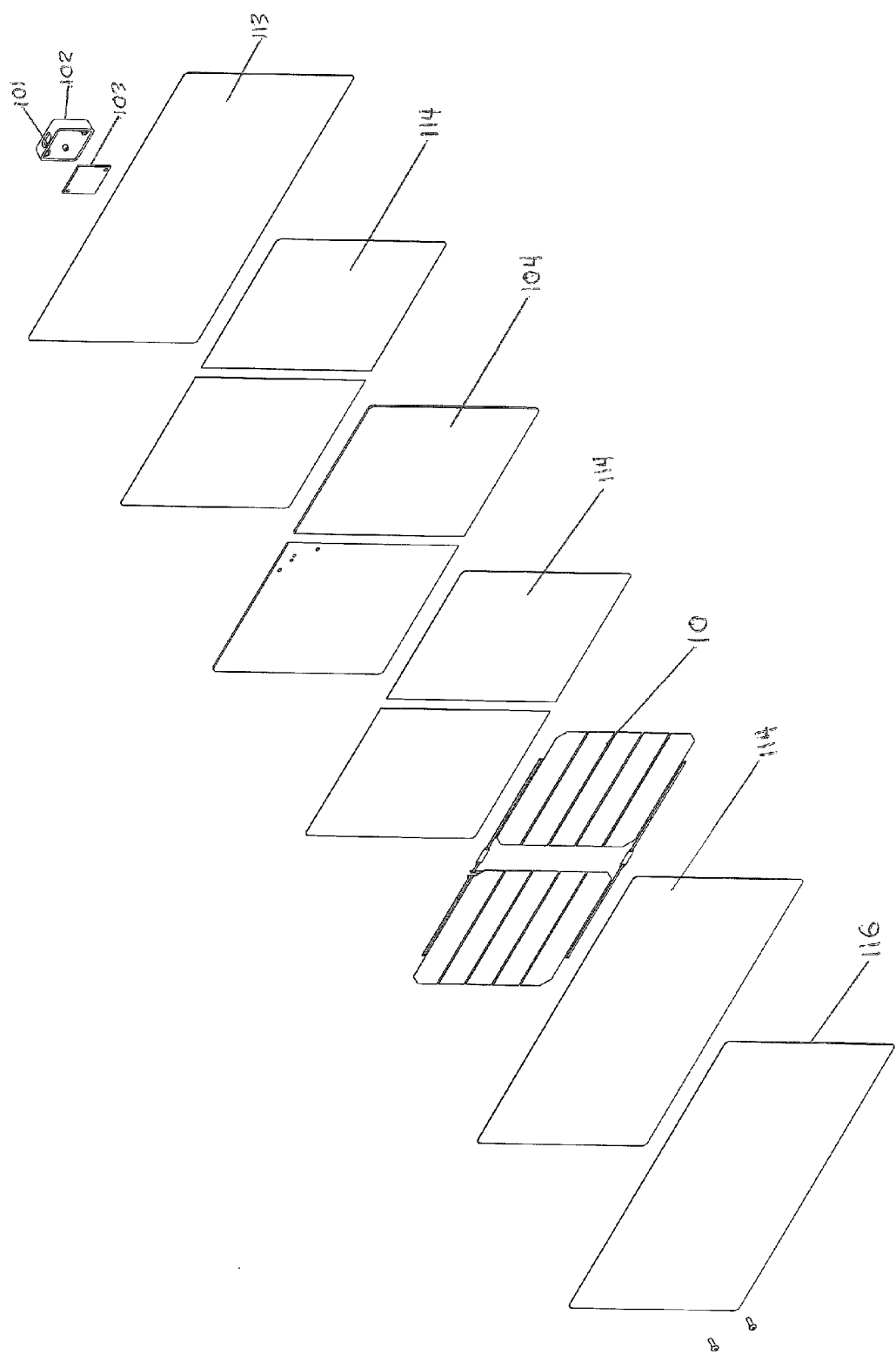
FIG. 5 is an exploded view of a solar USB charger.

Referring to FIG. 5, an exploded view of a solar USB charger provides a clearer representation of the various components of the charger 100, detailing the circuit enclosure 102 or case to protect the circuit board 103, an opening 101 to allow the USB cable to connect to the charger 100 that is mechanically fastened in close proximity to the external face of the backing board. The charger utilizes an adhesive 114 throughout wherein the clear front sheet 113 is adhered to the external face of the backing board 104 which is intern adhered to at least one solar panel 10 and bus bars which intern is adhered to a back sheet 116. Although it is desirable to have the front and back sheets 113,116 clear of transparent, it has further been contemplated utilizing an opaque material, colored sheet, or even a design or pattern in various embodiments.

FIGS. 6A, B, and C, are alternative embodiments of the solar USB charger 100 utilizing more than two panels with a clear depiction of a typical hinge point 120 fully assembled. Because power output is proportional to the surface area of the solar panels increasing the number of panels would also increase the power output and so larger devices could be powered with additional panels. Although we have described preferred embodiments with solar panels on only one face of the charger it has been contemplated to increase the surface area of the solar panels by incorporating them on not only the internal faces, but also the external faces of the device.

The invention has been described in terms of the preferred embodiment. One skilled in the art will recognize that it would be possible to construct the elements of the present invention from a variety of means and to modify the placement of the components in a variety of ways. While the embodiments of the invention have been described in detail and shown in the accompanying drawings, it will be evident that various further modifications are possible without departing from the scope of the invention as set forth in the following claims.

What is claimed is:

1. A portable foldable solar powered power supply comprising:
   and
   a first backing board and a second backing board pivotally connected, separated by a small interstitial hinged gap with a width ranging between 0.4 to 0.6 inches and thickness ranging between 0.011 to 0.013 inches;
   a first photovoltaic panel on an internal surface of the first backing board and a second photovoltaic panel on an internal surface of the second backing board, the first photovoltaic panel and the second photovoltaic panel including one or more photovoltaic cell encased in an ultraviolet radiation resistant sheet having a thickness ranging between 0.005 to 0.007 inches, the photovoltaic panel having a length ranging between 5.9 to 6.1 inches, breadth ranging between 5.4 to 5.6 inches, thickness ranging between 0.124 to 0.126 inches and electronically connected through a ribbon connector traversing the small interstitial hinged gap between the first backing board and the second backing board;

the first photovoltaic panel and the second photovoltaic panel connected via an electrical flex circuit to a charging circuit mounted on an external surface of the first backing board, the charging circuit having an auto reset capability to restore an original output of the portable solar powered power supply upon interruptions in solar power;

a plug and socket configuration connecting the charging circuit to an external device; and the portable solar powered supply having an overall thickness ranging between 0.13 to 0.15 inches in an open configuration and 0.27 to 0.29 inches in a folded configuration.

2. The portable solar powered power supply of claim 1, wherein the ultraviolet radiation resistant sheet is a form of clear plastic.

3. The portable solar powered power supply of claim 1 wherein the plug and socket configuration electronically connecting the charging circuit to an external device is a USB connector.

4. The portable solar powered power supply of claim 1 wherein the charging circuit further comprises: a pulse circuit; a regulation circuit; a low voltage cutout switch; a regulation circuit; a visible indicator; an OR gate, and; a voltage divider.

5. The portable solar powered power supply of claim 4 wherein the pulse circuit provides a voltage pulse to a device from the charger at a predetermined frequency to maximize the devices charging circuit and to provide an audible alert.

6. The portable solar powered power supply of claim 4 wherein pulse circuit frequency is approximately two minutes.

7. The portable solar powered power supply of claim 1 further comprising:

a visible indicator, the visible indicator electrically connected to the charging circuit.

\* \* \* \* \*